(12) United States Patent  
Song et al.

(10) Patent No.: US 8,660,048 B2  
(45) Date of Patent: Feb. 25, 2014

(54) WIRELESS RESOURCE SCHEDULING METHOD AND OCCUPIED INFORMATION SENDING METHOD FOR MULTI BASE STATION MBS

(75) Inventors: Jianquan Song, Shenzhen (CN); Ling Xu, Shenzhen (CN); Li Chu, Shenzhen (CN); Hongyun Qu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 602 days.

(21) Appl. No.: 12/810,143

(22) PCT Filed: Dec. 27, 2007

(86) PCT No.: PCT/CN2007/003828
§ 371 (c)(1),
(2), (4) Date: Aug. 25, 2010

(87) PCT Pub. No.: WO2009/082838
PCT Pub. Date: Jul. 9, 2009

(65) Prior Publication Data
US 2011/0044228 A1    Feb. 24, 2011

(51) Int. Cl.
*H04H 20/71*    (2008.01)
*H04W 72/00*    (2009.01)

(52) U.S. Cl.
CPC .................................. *H04W 72/005* (2013.01)
USPC ........... 370/312; 370/328; 370/338; 370/350; 370/390; 370/432; 455/422.1; 455/502; 455/503

(58) Field of Classification Search
None
See application file for complete search history.

(56) References Cited

U.S. PATENT DOCUMENTS

| | | | |
|---|---|---|---|
| 7,746,839 B2 * | 6/2010 | Jalil et al. ........................ | 370/343 |
| 7,869,378 B2 * | 1/2011 | Livet et al. ..................... | 370/252 |
| 7,996,455 B2 * | 8/2011 | Jackson .......................... | 709/200 |
| 8,159,986 B2 * | 4/2012 | Yun et al. ....................... | 370/312 |

FOREIGN PATENT DOCUMENTS

| | | |
|---|---|---|
| CN | 101060473 A | 10/2007 |
| CN | 101068432 A | 11/2007 |
| CN | 101132548 A | 2/2008 |
| CN | 101431721 | 5/2009 |
| KR | 10-2006-0034473 A | 4/2006 |
| WO | 2007144947 A1 | 12/2007 |

OTHER PUBLICATIONS

Rubin, Amir; Eliaspur, Yigal, MBS MAP Issue, IEEE 802.16 Broadband Wireless Access Working Group, May 1, 2005, 4 pages.

* cited by examiner

*Primary Examiner* — Faruk Hamza  
*Assistant Examiner* — Aixa A Guadalupe-Cruz  
(74) *Attorney, Agent, or Firm* — Marger Johnson & McCollom PC (57) ABSTRACT

The present invention discloses a method for scheduling wireless resources of a multi-base station MBS and a method for sending occupation information. The scheduling method comprises: dividing wireless resources of downlink sub-frames of all base stations in an MBS Zone into two parts, local service schedulers on the base stations scheduling one part for local services, and a multi-base station MBS resource scheduler in the MBS Zone scheduling the other part for the multi-base station MBS. The sending method comprises: a sender informing a receiver of multi-base station MBS wireless resource occupation situation through a message carrying multi-base station MBS wireless resource occupation information; the occupation information including configuration information and a scheduling result. When supporting the macro diversity multi-base station MBS, the present invention not only can avoid the conflict of unicast and MBS scheduling, but also can fully utilize the limited wireless resources of the system.

12 Claims, 3 Drawing Sheets

WIRELESS RESOURCE SCHEDULING METHOD AND OCCUPIED INFORMATION SENDING METHOD FOR MULTI BASE STATION MBS

TECHNICAL FIELD

The present invention relates to a World Interoperability for Microwave Access (WiMAX) network, and particularly, relates to a method for scheduling wireless resources of a multi-base station MBS which supports macro diversity and a method for sending occupation information.

BACKGROUND OF THE INVENTION

Requirements for MCBCS is defined in SPWG, and in IEEE802.16e-2005 specification, two types of MBSs are supported: one is MBS accessed by a single base station (BS), and the other is MBS accessed by multiple BSs.

For the MBS accessed by multiple BSs which supports macro diversity, at least one centralized MBS wireless resource scheduler is required in the MBS Zone. At present, the Network Work Group (NWG) protocol has not involved how to implement MBS wireless resource scheduling, and has not involved how to allocate and describe wireless resources either. Although at present, a multicast and broadcast service wireless resource occupation description method is defined in the IEEE802.16e-2005 specification, this description method is not the optimum. New allocation and description methods should be applied in the network side to increase the efficiency of transmitting MBS resource scheduling information. Wherein:

SPWG: Service Provider Work Group, which is a work group in the WiMAX forum.

WiMAX: World Interoperability for Microwave Access.

MCBCS: Multicast and Broadcast Service (defined in SPWG), for which a service type is defined, that is, this service can be received by multiple users. When this service is borne on an air interface, it can be received by multiple users through respective one-to-one unicast with the plurality of receiving users, or it can be received by multiple users through one-to-many multicast and broadcast with the plurality of receiving users. Using the latter manner can save air wireless resources.

MBS: Multicast and Broadcast Service, for which an air interface bearer mode is defined. It means the MBS is sent in the air by using the same wireless resource, and can be received by multiple users. The MBS is classified into single-base station MBS and multi-base station MBS. The single-base station MBS means there is only one base station performing multicast and broadcast transmission, and the multi-base station MBS means there is multiple base stations performing multicast and broadcast transmission.

Macro diversity: a terminal receiving the same service from multiple base stations. The multi-base station MBS requires support of the macro diversity.

Slot: the minimal allocation unit of a data area in an Orthogonal Frequency Division Multiple Access (OFDMA) system, formed by consecutive sub-channels and consecutive symbols.

MBS Zone: a set of base stations, which transmit the same multicast and broadcast service and have the same multicast connection identification and security association.

SFN: Single Frequency Network.

SUMMARY OF THE INVENTION

The technical problem to be solved by the present invention is how to provide a method for scheduling wireless resources of a multi-base station MBS supporting macro diversity and a method for sending occupation information, which not only can avoid the conflict of unicast and MBS scheduling, but also can fully utilize the limited wireless resources of the system, by scheduling the wireless resources of downlink sub-frames, when the macro diversity multi-base station MBS is supported.

In order to solve the above technical problem, the present invention provides a method for scheduling wireless resources of a multi-base station multicast and broadcast service (MBS), comprising:

a) dividing wireless resources of downlink sub-frames of all base stations in an MBS Zone into two parts; and b) local service schedulers (3) on the base stations scheduling one part of the wireless resources for local services, the local services including unicast or single-base station MBS; and a multi-base station MBS resource scheduler (2) in the MBS Zone scheduling the other part of the wireless resources for the multi-base station MBS.

Furthermore, in said division, an area formed by part of consecutive symbols and corresponding all sub-channels in an Orthogonal Frequency Division Multiple Access (OFDMA) downlink sub-frame is used for multi-base station MBS scheduling, or an area formed by part of the sub-channels and corresponding all symbols in the OFDMA downlink sub-frame is used for the multi-base station MBS scheduling.

Furthermore, the method further comprise: when a base station belongs to multiple MBS Zones, reserving one block of multi-base station MBS wireless resource for each MBS Zone to which the base station belongs; and when multi-base station MBS wireless resources reserved for all the MBS Zones are not overlapped, the multi-base station MBS resource scheduler in each MBS Zone scheduling the wireless resource reserved for the MBS Zone for the multi-base station MBS in the MBS Zone; and when multi-base station MBS wireless resources reserved for MBS Zones are overlapped, the multi-base station MBS resource schedulers in these MBS Zones coordinating when scheduling the multi-base station MBSs; wherein, multi-base station MBS wireless resources reserved for all the MBS Zones are not overlapped means the multi-base station MBS wireless resources reserved for all the MBS Zones occupy different areas in downlink sub-frames, or the number of sub-frames occupied are not overlapped.

Furthermore, the method further comprise: separately using a frequency point or frequency band for the multi-base station MBS.

Furthermore, the area for multi-base station MBS scheduling can be dynamically adjusted.

Furthermore, a network manager (1) performs the dynamic adjustment according to history statistic data, or locally scheduled service/multi-base station multicast and broadcast service prediction, or a combination thereof, and informs the multi-base station MBS resource scheduler (2) and the local service schedulers (3) on base stations in the same MBS Zone.

Furthermore, the method further comprise: locally scheduled services sharing the multi-base station MBS resources, which comprises:

the local service scheduler (3) on a base station using unoccupied reserved multi-base station MBS resource for the local service according to an obtained real-time scheduling result of the multi-base station MBS resource scheduler (2); and when there is no resource for local service scheduling, a local urgent service occupying reserved multi-base station MBS resource.

Furthermore, the local service scheduler (3) on the base station obtains the real-time scheduling result means:

during MBS resource scheduling, the multi-base station MBS resource scheduler (2) sends an MBS resource scheduling result to the local service scheduler (3) on the base station in real time.

Furthermore, the local service scheduler (3) on the base station obtains the real-time scheduling result means:

the local service scheduler (3) on the base station actively or periodically requests the multi-base station MBS resource scheduler (2) to inform current MBS resource occupation situation.

The present invention also provides a method for sending multi-base station MBS wireless resource occupation information based on the scheduling method described above, comprising:

a sender informing a receiver of multi-base station MBS wireless resource occupation situation through a message carrying multi-base station MBS wireless resource occupation information, and content of said multi-base station MBS wireless resource occupation information including a sending frame offset field, an index field and a resource unit quantity field; and said multi-base station MBS wireless resource occupation information including configuration information and a scheduling result; said configuration information being an MBS area divided in a downlink sub-frame for multi-base station MBS scheduling; and said scheduling result being a result of each scheduling by a multi-base station MBS scheduler.

Furthermore, said multi-base station MBS wireless resource occupation information further includes a direction field and a resource unit field.

Furthermore, if the scheduling result has periodicity, said multi-base station MBS wireless resource occupation information further includes a cycle length and the number of cycles.

Compared with the prior art, the method for scheduling wireless resources of a multi-base station MBS and the method for sending its occupation information provided in the present invention have the following advantages:

1. By dividing one part of resources of downlink sub-frames as multi-base station MBS wireless resources, scheduling of multi-base station MBS wireless resources in the MBS Zone and scheduling of wireless resources (used for unicast and single-base station MBSs on base stations) on base stations for local services can be independent;

when a base station belongs to multiple MBS Zones, the independent scheduling of reserved multi-base station MBS wireless resource by each MBS Zone to which the base station belongs can be realized, or reserved multi-base station MBS wireless resources are scheduled based on the coordination of the MBS Zones;

2. The local service scheduler on a base station can schedule unused reserved multi-base station MBS resource in a current frame, and an urgent service scheduled locally on the base station can occupy the reserved MBS resource area, so as to realize sharing of the reserved multi-base station MBS wireless resources by locally scheduled services on base stations and the multi-base station MBS service in the MBS Zone;

3. A new allocation unit is used in multi-base station MBS resource allocation, which facilitates the increase of resource marking efficiency;

4. For MBS resource scheduling results with periodic characteristic, a new wireless resource occupation information description method is applied, which can increase the efficiency of transmitting multi-base station MBS resource scheduling results. If the wireless resource occupation information description method is applied in air interfaces, it helps terminals to receive multicast and broadcast services in power saving mode.

PREFERRED EMBODIMENTS OF THE PRESENT INVENTION

The technical scheme of the present invention will be described in more detail below in conjunction with drawings and embodiments.

Firstly, the conception of the present invention is:

When macro diversity multi-base station MBS is supported, two types of schedulers are set, one is a multi-base station MBS resource scheduler, and the other is a local service scheduler; in each MBS Zone, there exists one multi-base station MBS resource scheduler for scheduling the multi-base station MBS in the MBS Zone; and on each base station in the MBS Zone, there is a local service scheduler in charge of scheduling the unicast service and single-base station MBS on the local base station.

Because the local service scheduler and the multi-base station MBS resource scheduler both schedule the wireless resources of downlink sub-frames, first they must be prevented from allocating the same part of a same downlink sub-frame, otherwise there will be a conflict in the resource allocation of the multi-base station MBS resource scheduler in the MBS Zone and the local service scheduler. Thus the wireless resource of the downlink sub-frame should be divided, with any one part being used for local service scheduling (local service include unicast or single-base station MBS), and the other part being used for multi-base station MBS; and thereby wireless resources are reserved for both the local service and the multi-base station MBS, which can completely avoid the conflict in resource scheduling in the local MBS Zone. There are two ways of division in all, which will be described in detail later.

After division or each scheduling, the multi-base station MBS wireless resource occupation information is required to be sent to the local service scheduler on each base station and/or the multi-base station MBS resource scheduler; the multi-base station MBS wireless resource occupation information includes configuration information and/or a scheduling result; the configuration information is a scheduling area configured in a downlink sub-frame for the multi-base station MBS; and the scheduling result is a result of each scheduling by the multi-base station MBS scheduler.

The wireless resource may be divided by, but not limited to, a network manager, and after the division, the configuration information will be sent by the network manager to the local service scheduler on each base station and the multi-base station MBS resource scheduler in the MBS Zone.

In the scheduling, the multi-base station MBS resource scheduler will send the scheduling result to all the local service schedulers in the MBS Zone, and the local service scheduler will combine the received multi-base station MBS scheduling result with the local scheduling result and send them out through an air interface.

If a base station belongs to multiple MBS Zones, a conflict may occur when the MBS resource schedulers in the plurality of MBS Zones schedule the wireless resource reserved for multi-base station MBSs. In this situation, one block of multi-base station MBS wireless resource may be reserved for each MBS Zone to which the base station belongs. The multi-base station MBS wireless resource reserved in this situation can be described by two independent variables, namely the area occupied by the reserved multi-base station MBS wireless resource in a downlink sub-frame, and the characteristic of the number of sub-frames occupied by the multi-base station MBS wireless resource. In this situation, if it should be ensured that each MBS Zone can independently schedule the reserved MBS resource, it is required that the multi-base station MBS wireless resources reserved for the plurality of MBS Zones can not be overlapped. If the multi-base station MBS wireless resources reserved for all the MBS Zones occupy different areas in downlink sub-frames, or the number of sub-frames occupied are not overlapped (for example, a BS belongs to two MBS Zones, one of the MBS Zones may only occupy odd frames, and the other one may only occupy even frames), then it is ensured that the multi-base station MBS wireless resources reserved for all the MBS Zones to which the base station belongs are not overlapped in this situation, and the MBS resource scheduler in each MBS Zone schedules the wireless resource reserved for the MBS Zone for the multi-base station MBS of the MBS zone; if the MBS resources reserved for the plurality of MBS Zones to which the base station belongs are overlapped, the MBS resource schedulers in the plurality of MBS zones need to coordinate when scheduling the multi-base station MBSs.

The scheduling of the wireless resources of downlink sub-frames provided in the present invention not only can avoid the conflict between the local scheduling and the scheduling of the multi-base station MBS in an MBS Zone on a base station, but also can avoid the conflict between scheduling in different MBS Zones when a base station belongs to multiple MBS Zones; and furthermore, can fully utilize the limited wireless resources of the system.

Secondly, the key points of the present invention include:

1. Two methods for dividing an OFDMA downlink sub-frame to be used as multi-base station MBS wireless resource are provided in the present invention, which facilitates the respective independent scheduling of locally scheduled services and a multi-base station MBS in the MBS Zone on a base station when implementing the MBS accessed by multiple base stations in an SFN of macro diversity; and the multi-base station MBS wireless resource divided with each of the division methods may vary dynamically, thereby increasing the overall utilization efficiency of the wireless resources;

2. The divided MBS wireless resources can be shared by the locally scheduled services, thereby increasing the overall utilization efficiency of the wireless resources;

If a base station belongs to multiple MBS Zones, one block of multi-base station MBS wireless resource can be reserved for each MBS Zone, and as long as the multi-base station MBS wireless resources reserved for all the MBS Zones to which the base station belongs are not overlapped, the MBS resource scheduler of each MBS Zone can perform independent scheduling. Otherwise, the reserved multi-base station MBS wireless resources are scheduled based on coordination of the MBS Zones.

3. A new minimal allocation unit of MBS wireless resource is defined, which facilitates the increase of resource marking efficiency;

4. A new way of describing MBS wireless resource occupation information is defined, which increases description efficiency; and for the service of which the scheduling result has a periodic characteristic, it can further increase the resource scheduling result transmission efficiency.

5. Definitions of the new minimal allocation unit and the new way of describing the occupation information can be applied not only in transmission of multi-base station MBS wireless resources by the network side, but also in transmission on air interfaces. Particularly, when scheduling results have periodicity, it helps terminals to operate in power saving mode.

Thirdly, the particular technical measures of the present invention according to the two division methods are:

(1) Vertical Division

As for the downlink frame structure of the OFDMA, certain wireless resource acquired by proportionally dividing the frame structure can be used for a multi-base station MBS; because macro diversity can only be provided by an SFN, and although in the SFN, different sectors can use different segments, for the MBS, macro diversity can span multiple sectors, therefore for the SFN, the divided multicast and broadcast wireless resource can occupy all the sub-channels. The area in a downlink sub-frame divided according to this way, which is used for a multi-base station MBS, is an area formed by all the sub-channels and part of the consecutive symbols; the starting symbol can be counted from any side, and right side is recommended; the starting symbol is the $M^{th}$ symbol from the left side or right side in the downlink sub-frame, and the ending symbol is the $N^{th}$ symbol from the left side or the right side; the values of M and N should be transmitted during transmission, and if M takes a default value, only the value of N needs to transmitted during transmission.

Figure 1:
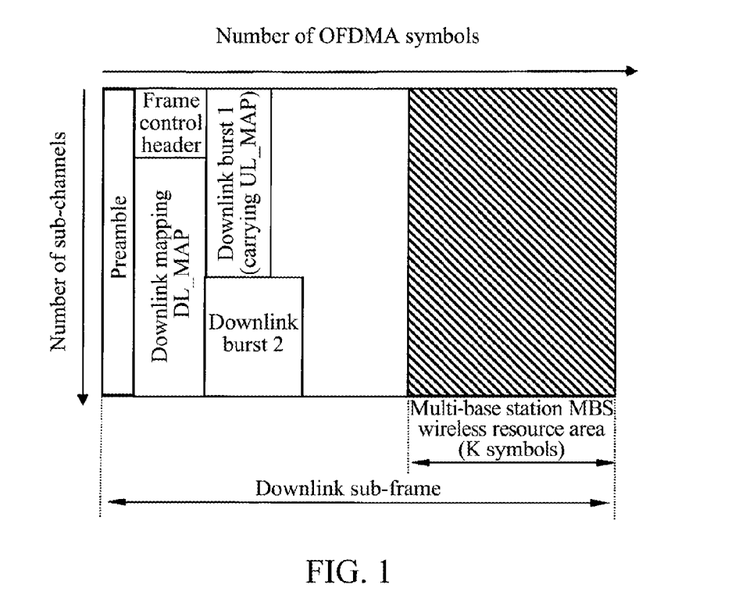
FIG. 1 is a schematic diagram of a first way of dividing MBS wireless resource in accordance with the present invention.
Figure 2:
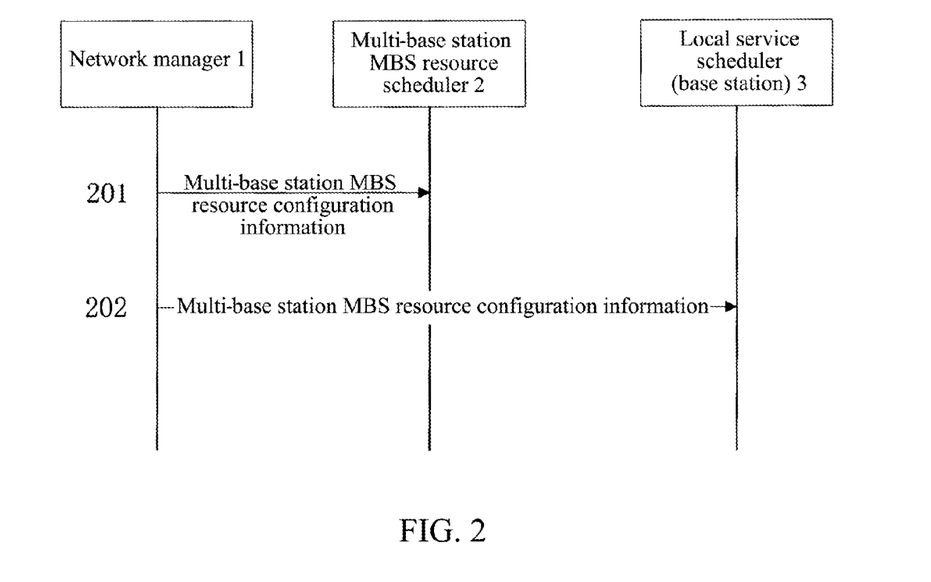
FIG. 2 is a schematic diagram of a method for sending MBS resource configuration information in accordance with the present invention.

As shown in FIG. 1, the multi-base station multicast and broadcast wireless resource occupies the $M^{th}$ symbol (M is 0 in the figure) from the right side to the $N^{th}$ symbol in the entire downlink sub-frame, where N is larger than M, and the difference between N and M is K (N is equal to K in the figure). The initial values of the M, N or M, K can be configured on a network manager and sent to the local service scheduler on each base station and the multi-base station multicast and broadcast resource scheduler in the MBS Zone, as shown in FIG. 2. For each MBS Zone, the value of K can be dynamically adjusted according to history statistic data, locally scheduled service/multi-base station multicast and broadcast service prediction or their combination, and once the value of K changes, each local service scheduler and the multi-base station multicast and broadcast resource scheduler within the MBS Zone should be informed. Moreover, if any of the values of M, N or M, K changes, local service schedulers and the multi-base station multicast and broadcast resource scheduler within the MBS Zone should be informed. In this way, the multi-base station MBS resource scheduler and the local service schedulers on base stations within the MBS Zone independently schedule the multi-base station multicast and broadcast resources and the locally scheduled resources on the base stations respectively.

The dynamic adjustment of the value of K can bring the following advantages: if it is predicted that in a certain period, the demand for multi-base station multicast and broadcast service is large and the quantity of the locally scheduled services on base stations is small, then the value of K can take a larger value; while if it is predicted that in a certain period, the demand for multi-base station multicast and broadcast service is small and the quantity of the locally scheduled services is large, then the value of K can take a smaller value, thereby bringing about the most profits for users and the operator.

Figure 3:
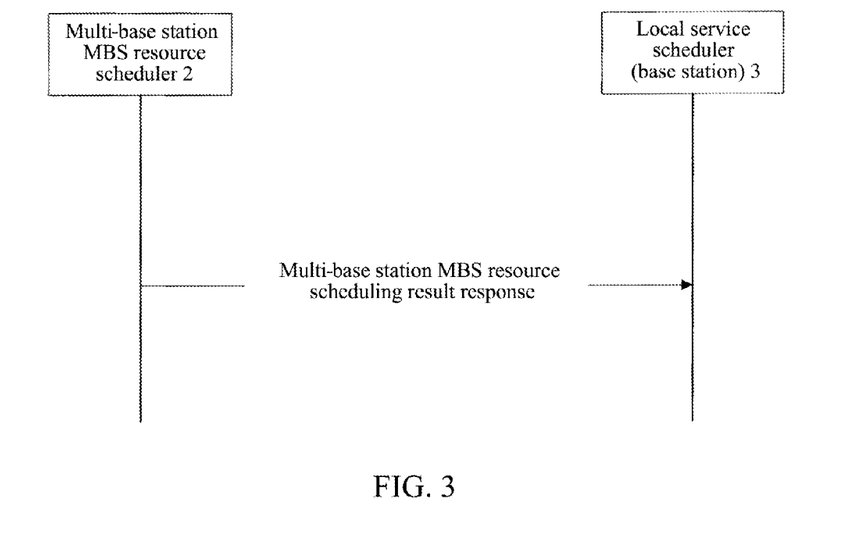
FIG. 3 is a schematic diagram of a method for sending an MBS resource scheduling result in accordance with the present invention.

In the above way, the wireless resource of the OFDMA downlink sub-frame is divided into a multi-base station multicast and broadcast service area and a locally scheduled area, which are scheduled independently, but if there is no multi-base station multicast and broadcast service currently, the multi-base station multicast and broadcast resource will be wasted. In order to increase the resource utilization efficiency, it needs to be realized that the multi-base station multicast and broadcast resource can be shared by the local service, in other words, the multi-base station multicast and broadcast resource unused currently can be shared by the local service. This requires the multi-base station MBS resource scheduler in the MBS Zone to send the multi-base station MBS resource scheduling result to local service schedulers on base stations in real time, as shown in FIG. 3. When the multi-base station MBS resource scheduler in the MBS Zone informs the local service schedulers on the base stations in the MBS Zone of the multi-base station MBS resource scheduling result, the multi-base station MBS resource currently unoccupied by multi-base station MBS can be used for local service scheduling, thereby realizing the sharing of the multi-base station multicast and broadcast wireless resource by the local service, thus increasing the wireless resource utilization efficiency.

In addition to every time the multi-base station MBS resource scheduler in an MBS Zone schedules multi-base station MBS resource, it will initiatively send the multi-base station MBS resource scheduling result to local service schedulers on the base stations in real time, the multi-base station MBS resource scheduler also can periodically originate the sending; and the local service schedulers in the MBS Zone can also use the following ways (FIG. 4) to obtain the current multi-base station MBS resource occupation situation:

(1) Active request; local service schedulers actively request the multi-base station MBS resource scheduler to inform the local service schedulers of current multi-base station MBS resource occupation situation;

(2) Periodic request; local service schedulers periodically request the multi-base station MBS resource scheduler to inform them of current multi-base station MBS resource occupation situation.

No matter which way is used, the resource scheduling result information includes the current multi-base station MBS resource occupation situation, which is marked as allocated multi-base station MBS resource. Marking of the multi-base station MBS resource may use an existing description way in the IEEE802.16e-2005 air interface, or may use a new description way.

When the locally scheduled resource and the multi-base station MBS scheduling resource are shared, and unused multi-base station MBS resource are used for the locally scheduled service, it is preferably used for Best Effort (BE) type locally scheduled service, because for the reserved multi-base station MBS resource area in the downlink sub-frame, the multi-base station MBS is prior.

If there is no available locally scheduled resource, an urgent service of the local service can occupy the reserved multi-base station MBS resource.

As previously mentioned, the efficiency of describing the MBS wireless resource occupation information in the IEEE802.16e-2005 air interface is not high. A new allocation way can be applied to increase the description efficiency. The current description way in the IEEE802.16e air interface is: the scheduling information described by MBS_DATA_IE (or Extended_MBS_DATA_IE) is a combination of 5 fields: frame offset, sub-channel offset/symbol-offset, sub-channel quantity/symbol quantity, which are totally 29 bits; information of the next scheduling is described in the same way in the next MBS_DATA_IE (or Extended_MBS_DATA_IE); and the current MBS_DATA_IE (or Extended_MBS_DATA_IE) does not point to the position of the next MBS_DATA_IE (or Extended_MBS_DATA_IE) directly, but indicates the position of the MBS_MAP message instead for indirectly finding the next MBS_DATA_IE (or Extended_MBS_DATA_IE). The scheduling is in units of slots.

Figure 5:
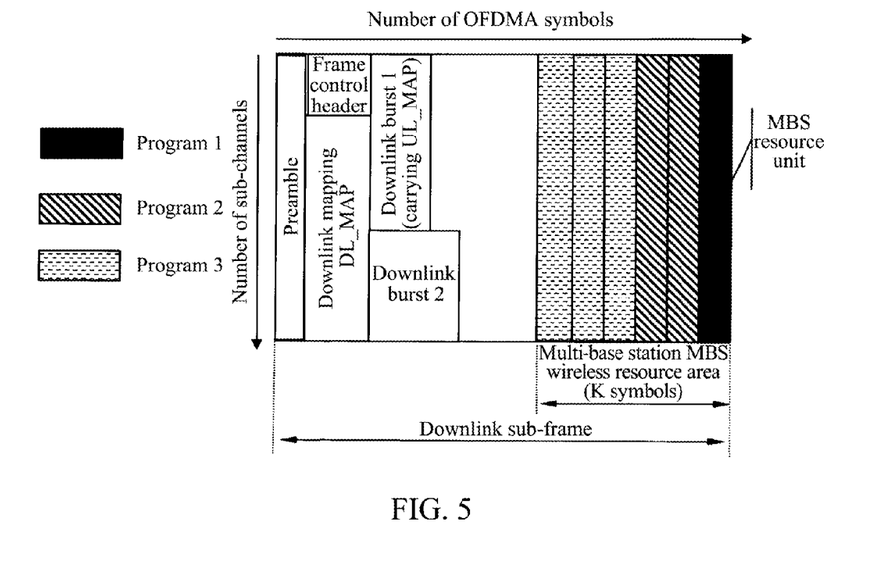
FIG. 5 is a schematic diagram of the MBS resources allocation unit and the allocation.

Because the multicast and broadcast service does not need to take the frequency selection effect into account, the minimal allocation unit "slot" of the multi-base station multicast and broadcast service can be separately defined, that is, the minimal allocation unit of the wireless resource of the multi-base station multicast and broadcast service may occupy all the sub-channels or part of the sub-channels of the multicast and broadcast resource (such as ½, ¼, ⅛, or ¹⁄₁₆ etc. of the quantity of the sub-channels), and may occupy one or more symbols. The size of the allocation unit decides the size of a resource fragment possibly generated. If a big resource allocation unit is required, preferably the quantity of sub-channels of the allocation unit instead of the quantity of symbols is increased. FIG. 5 is a schematic diagram of a multi-base station MBS resource allocation result after a new resource allocation unit is applied, from which it can be seen that three programs in a multi-base station MBS occupy K symbols altogether and each occupies all the sub-channels.

In resource allocation, the resource can be allocated from any side of the wireless resource divided for the multi-base station MBS; and if the resource unit does not occupy all the sub-channels, the allocation principle is to try to occupy all the sub-channels first, and then to occupy new symbols. Thus, the wireless resource occupied in the multi-base station MBS wireless resource area can be represented by a combination of 5 fields: frame offset, direction, resource unit, index and resource unit quantity; herein the index represents the starting number of the occupation of a multi-base station MBS allocation block in the multi-base station MBS wireless resource block, when the multi-base station MBS wireless resource area is allocated from one side and the entire multi-base station MBS wireless resource area is numbered according to the resource unit. If it is determined beforehand that the multi-base station MBS wireless resource is allocated from which side, the field of direction can be omitted, and if the resource unit is also determined beforehand, the field of resource unit can also be omitted, thus finally only a combination of 3 fields of frame offset, index and quantity is required, thereby saving two fields compared with the previous representation method. If the default resource unit is appropriate, the two fields of index and quantity only require a few bits.

The scheduling result of a real-time and bandwidth fixed service has periodicity. The multi-base station MBS resource scheduler only needs to transmit the periodic scheduling characteristic to the multi-base station MBS framing function and the local service schedulers at one time, instead of performing transmission every time, so as to increase the efficiency of transmitting scheduling information greatly. When the multi-base station MBS resource scheduler transmits scheduling result information, two fields of cycle length and number of cycles can be added on the basis of the frame offset, index and quantity. The cycle length is represented by the quantity of downlink sub-frames.

Thus when the multi-base station MBS resource scheduler in the MBS Zone informs the function for constructing MBS MAC PDUs (Protocol Data Units) in the MBS Zone and the local service schedulers of a multi-base station MBS resource scheduling result, only a little resource scheduling information is used. Similarly, such manner can also be applied in an air interface which is used by a base station to inform a terminal of a scheduling result of a multi-base station MBS. After the terminal receives the scheduling result, it may receive the multi-base station MBS in Idle mode or Sleep mode, depending on the actual situation, so as to save power.

Further description below is in conjunction with three particular sending methods shown in FIG. 2, FIG. 3 and FIG. 4.

In the first way, a network manager 1 sends configured multi-base station MBS resource, as shown in FIG. 2, including the following steps:

201) The network manager 1 sends a configured multi-base station MBS resource result to a multi-base station MBS resource scheduler 2 in an MBS Zone, and the multi-base station MBS resource configuration information can be represented by the values of M and N, or the value of M (when N takes a default value), or the value of K (when N takes the default value);

202) The network manager 1 sends the configured multi-base station MBS resource result to a local service scheduler 3 in the MBS Zone, and the multi-base station MBS resource configuration information can be represented by the values of M and N, or the value of M (when N takes the default value), or the value of K (when N takes the default value).

In the second way, a multi-base station MBS resource scheduler in an MBS Zone originates sending a real-time multi-base station MBS resource scheduling result, as shown in FIG. 3, including the following steps:

The multi-base station MBS resource scheduler 2 sends a multi-base station MBS resource scheduling information response message to a local service scheduler 3 in the MBS Zone, and the resource scheduling information response message includes a current multi-base station MBS resource scheduling result; the multi-base station MBS resource scheduling result may apply the description way in 802.16e-2005, or may be represented by the frame offset, direction, resource unit, index and resource unit quantity, wherein, if it has a periodic characteristic, two fields of cycle length and number of cycles may be added, and if the direction and the resource unit take default values, they may be omitted.

Figure 4:
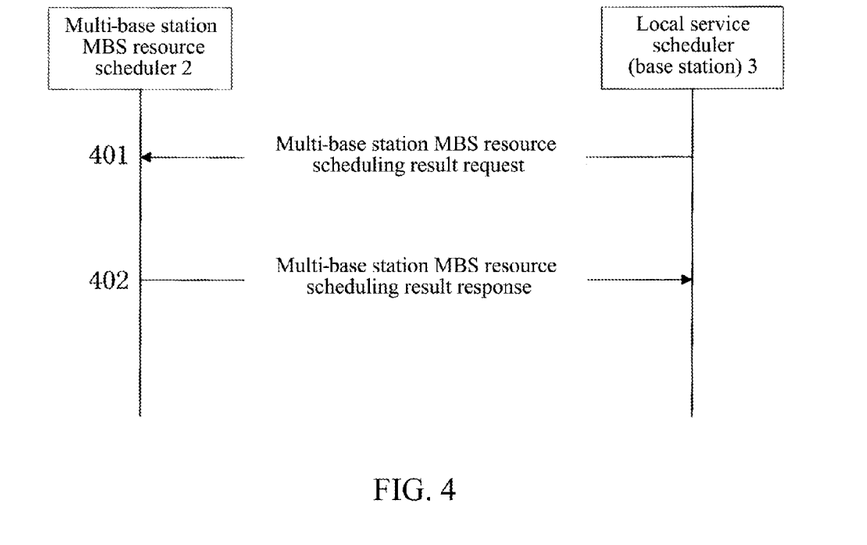
FIG. 4 is a schematic diagram of another method for sending an MBS resource scheduling result in accordance with the present invention.

In the third way, a base station actively requests current multi-base station MBS resource real-time scheduling situation from a multi-base station MBS resource scheduler in an MBS Zone, as shown in FIG. 4, including the following steps:

401) A local service scheduler 3 on a base station sends a multi-base station MBS resource scheduling information request message to a multi-base station MBS resource scheduler 2;

402) The multi-base station MBS resource scheduler 2 sends a multi-base station MBS resource scheduling information response message to the local service scheduler 3 in the MBS Zone, and the resource scheduling information response message includes a current multi-base station MBS resource scheduling result; the multi-base station MBS resource scheduling information may apply the description way in 802.16e-2005, or may be represented by the frame offset, direction, resource unit, index and resource unit quantity, wherein if it has a periodic characteristic, two fields of cycle length and number of cycles may be added, and if the direction and the resource unit take default values, they may be omitted.

(2) Horizontal division

Figure 6:
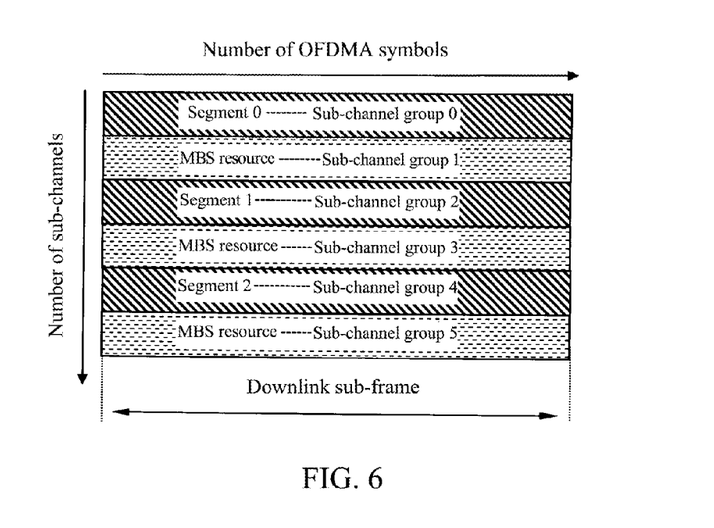
FIG. 6 is a schematic diagram of a second way of dividing MBS wireless resource in accordance with the present invention.

According to the aforementioned resource division way of vertical division, in an SFN, a part of wireless resource is specially divided to be used for a multi-base station MBS, and this part of wireless resource occupies all the sub-channels and part of the consecutive symbols (the quantity of symbols occupied is K). In addition, there is a horizontal division way, in which a frequency point or frequency band can be separately divided to be used for a multi-base station MBS; for example, in an SFN network, the wireless resource used for a multi-base station MBS in a downlink sub-frame is an area occupying all the symbols (excluding the symbols occupied by the preamble and FCH/DL_MAP in the downlink sub-frame) and part of the sub-channels (the part of the sub-channels may include the numbers of one or more sub-channel groups), as shown in FIG. 6. In this division way, the quantity of sub-channel groups occupied by a multi-base station MBS can also be dynamically adjusted according to history statistic data, locally scheduled service/multi-base station multicast and broadcast service prediction, or their combination, so as to increase the overall utilization efficiency of the wireless resource.

Except for the difference between the resource division way in this scheme and that of the vertical division, the technical problem to be solved and the solution in this scheme are similar to those of the vertical division, and they will be briefly described below.

When an MBS Zone initially sets the wireless resource occupied by a multi-base station MBS, or the wireless resource occupied by the multi-base station MBS changes (i.e., the quantity or numbers of occupied sub-channel groups change), the network manager needs to inform the multi-base station MBS scheduler and the local service schedulers on base stations in the MBS Zone of the numbers of the sub-channel groups occupied by the multi-base station MBS, which is similar to FIG. 2.

In order to implement the sharing of multi-base station multicast and broadcast wireless resources of by local services (including unicast and single-base station MBSs), the multi-base station MBS resource scheduler in the MBS Zone informs the local service schedulers on the base stations in the MBS Zone of a multi-base station MBS resource scheduling result in real time, and the local service schedulers on the base stations can use the multi-base station MBS resource currently unoccupied by the multi-base station MBS for their local service scheduling, thereby implementing the sharing of the multi-base station multicast and broadcast wireless resources in the MBS Zone by locally scheduled services of base stations to increase utilization efficiency of the wireless resources. When using this way to implement the sharing of multi-base station multicast and broadcast wireless resources by locally scheduled services, it is required to determine beforehand which segment used for locally scheduled service is able to share the sub-channel groups of the multi-base station multicast and broadcast wireless resource.

The multi-base station MBS resource scheduler initiatively or periodically sends the multi-base station MBS resource occupation information to the local service schedulers on base stations in the MBS Zone, which is similar to FIG. 3.

The local service schedulers on base stations in the MBS Zone may also periodically or actively request the multi-base station MBS resource scheduler to send the current multi-base station MBS resource occupation situation to the local service schedulers on base stations in the MBS Zone, which is similar to FIG. 4.

When the local service scheduling resource and the multi-base station MBS scheduling resource are shared, and the unused multi-base station MBS resource is used for the locally scheduled service, it is preferably used for Best Effort (BE) type locally scheduled service, because for the reserved multi-base station MBS resource in the downlink sub-frame, the MBS is prior.

In this multi-base station MBS wireless resource division way, the minimal unit of multi-base station MBS wireless resource allocation and the multi-base station MBS wireless resource scheduling method and transmission of the scheduling result can all apply methods similar to those in vertical division. That is, the minimal resource allocation unit of the multi-base station MBS can occupy all the sub-channels or part of the sub-channels under this division way, and can occupy one or more symbols.

In resource allocation, the resource can be allocated from any side of the wireless resource divided for the multi-base station MBS; and if the resource unit does not occupy all the sub-channels, the allocation principle is to try to occupy all the sub-channels first, and then to occupy new symbols. Thus, the wireless resource occupied in the multi-base station MBS wireless resource area can be represented by a combination of 5 fields: frame offset, direction, resource unit, index and resources unit quantity; herein the index represents the starting number of the occupation of a multi-base station MBS allocation block in the multi-base station MBS wireless resource block, when the multi-base station MBS wireless resource area is allocated from one side and the entire multi-base station MBS wireless resource area is numbered according to the resource unit. If it is determined beforehand that the multi-base station MBS wireless resource is allocated from that side, the field of direction can be omitted, and if the resource unit is also determined beforehand, the field of resource unit can also be omitted, thus finally only a combination of 3 fields of frame offset, index and quantity is required, thereby saving two fields compared with the previous representation method. If the default resource unit is appropriate, the two fields of index and quantity only require a few bits.

The scheduling information of a real-time and bandwidth fixed service has periodicity. The multi-base station MBS resource scheduler only needs to transmit the periodic scheduling characteristic to the function for constructing MBS MAC PDUs and the local service schedulers on base stations at one time, instead of performing transmission every time, which can increase the efficiency of transmitting scheduling information greatly. When the multi-base station MBS resource scheduler transmits the scheduling information, two fields of cycle length and number of cycles can be added on the basis of the frame offset, index and quantity. The cycle length is represented by the quantity of downlink sub-frames.

Thus when the multi-base station MBS resource scheduler in the MBS Zone informs the function for constructing the MBS MAC PDUs in the MBS Zone and the local service schedulers on base stations of a MBS resource scheduling result, much resource will be saved. Similarly, such manner can also be applied in an air interface which is used by a base station to inform a terminal of scheduling information of a multi-base station MBS. After the terminal receives the scheduling information, it may receive the multi-base station MBS in Idle mode or Sleep mode, depending on the actual situation, so as to save power.

Certainly, the present invention may have many other embodiments. Without departing from the spirit and essence of the present invention, those skilled in the art can make various corresponding modifications and variations according to the present invention, but all such corresponding modifications and variations shall fall within the protection scope of the appended claims of the present invention.

INDUSTRIAL APPLICABILITY

The present invention can implement respective independent scheduling of multi-base station MBS wireless resources and local resources in an MBS Zone; when a base station belongs to multiple MBS Zones, the present invention can implement independent scheduling of reserved multi-base station MBS wireless resource by each of the MBS Zones to which the base station belongs, or scheduling of the reserved multi-base station MBS wireless resource based on coordination of the MBS Zones. In addition, the local service scheduling can use the resource currently unused by the multi-base station MBS in the frame to implement the sharing of the multi-base station MBS wireless resource by local services; a new allocation unit is used in multi-base station MBS resource allocation, which facilitates the increase of resource marking efficiency; and a new scheduling description method is applied for multi-base station MBS resource scheduling results with periodic characteristic, which can increase the efficiency of transmitting multi-base station MBS resource scheduling information. If this scheduling information description method is applied in air interfaces, it helps terminals to receive multicast and broadcast services in power saving mode.

What is claimed is:

1. A method for scheduling wireless resources of a multi-base station multicast and broadcast service (MBS), comprising:
    a) dividing wireless resources of a downlink sub-frames into two independent parts; and
    b) a local service scheduler (3) on a base station in an MBS Zone allocating wireless resources in one part of the wireless resources for local services, the local services including unicast service or single-base station MBS; and a multi-base station MBS resource scheduler (2) in the MBS Zone allocating wireless resources in the other part of the wireless resources for the multi-base station MBS;
    wherein when a base station belongs to multiple MBS Zones, reserving one block of multi-base station MBS wireless resource for each MBS Zone to which the base station belongs; and
    when multi-base station MBS wireless resources reserved for all the MBS Zones are not overlapped, the multi-base station MBS resource scheduler in each MBS Zone scheduling the wireless resource reserved for the MBS Zone for the multi-base station MBS in the MBS Zone; and when multi-base station MBS wireless resources reserved for MBS Zones are overlapped, the multi-base station MBS resource schedulers in these MBS Zones coordinating when scheduling the multi-base station MBSs; and
    wherein multi-base station MBS wireless resources reserved for all the MBS Zones are not overlapped means the multi-base station MBS wireless resources reserved for all the MBS Zones occupy different areas in downlink sub-frames, or the number of sub-frames occupied are not overlapped.

2. The method as claimed in claim 1, wherein,
in said division, an area formed by part of consecutive symbols and corresponding all sub-channels in an Orthogonal Frequency Division Multiple Access (OFDMA) downlink sub-frame is used for multi-base station MBS scheduling, or an area formed by part of the sub-channels and corresponding all symbols in the OFDMA downlink sub-frame is used for the multi-base station MBS scheduling.

3. The method as claimed in claim 2, wherein,
the area for multi-base station MBS scheduling can be dynamically adjusted.

4. The method as claimed in claim 3, wherein,
a network manager (1) performs the dynamic adjustment according to history statistic data, or locally scheduled service/multi-base station multicast and broadcast service prediction, or a combination thereof, and informs the multi-base station MBS resource scheduler (2) and the local service schedulers (3) on base stations in the same MBS Zone.

5. The method as claimed in claim 1, further comprising:
separately using a frequency point or frequency band for the multi-base station MBS.

6. The method as claimed in claim 1, further comprising:
locally scheduled services sharing the multi-base station MBS resources, which comprises:
the local service scheduler (3) on a base station using unoccupied reserved multi-base station MBS resource for the local service according to an obtained real-time scheduling result of the multi-base station MBS resource scheduler (2); and
when there is no resource for local service scheduling, a local urgent service occupying reserved multi-base station MBS resource.

7. The method as claimed in claim 6, wherein the local service scheduler (3) on the base station obtains the real-time scheduling result means:
during MBS resource scheduling, the multi-base station MBS resource scheduler (2) sends an MBS resource scheduling result to the local service scheduler (3) on the base station in real time.

8. The method as claimed in claim 6, wherein the local service scheduler (3) on the base station obtains the real-time scheduling result means:
the local service scheduler (3) on the base station actively or periodically requests the multi-base station MBS resource scheduler (2) to inform current MBS resource occupation situation.

9. A method for sending multi-base station MBS wireless resource occupation information based on the scheduling method of claim 1, comprising:
a sender informing a receiver of multi-base station MBS wireless resource occupation situation through a message carrying multi-base station MBS wireless resource occupation information, and content of said multi-base station MBS wireless resource occupation information including a sending frame offset field, an index field and a resource unit quantity field; and
said multi-base station MBS wireless resource occupation information including configuration information and a scheduling result; said configuration information being an MBS area divided in a downlink sub-frame for multi-base station MBS scheduling; and said scheduling result being a result of each scheduling by a multi-base station MBS scheduler.

10. The method as claimed in claim 9, wherein,
said multi-base station MBS wireless resource occupation information further includes a direction field and a resource unit field.

11. The method as claimed in claim 10, wherein,
the scheduling result has periodicity and said multi-base station MBS wireless resource occupation information further includes a cycle length and a number of cycles.

12. The method as claimed in claim 9, wherein, the scheduling result has periodicity and said multi-base station MBS wireless resource occupation information further includes a cycle length and a number of cycles.

* * * * *